(12) United States Patent
Duch et al.

(10) Patent No.: US 9,139,042 B2
(45) Date of Patent: Sep. 22, 2015

(54) SEALING DEVICE FOR A HUB-WHEEL ASSEMBLY

(71) Applicants: Daniele Duch, San Gillio (IT); Fausto Morello, Sommariva del Bosco (IT)

(72) Inventors: Daniele Duch, San Gillio (IT); Fausto Morello, Sommariva del Bosco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/450,606

(22) Filed: Aug. 4, 2014

(65) Prior Publication Data

US 2015/0036957 A1 Feb. 5, 2015

(30) Foreign Application Priority Data

Aug. 2, 2013 (IT) .............................. TO2013A0660

(51) Int. Cl.
  *F16C 33/72* (2006.01)
  *B60B 27/00* (2006.01)
  *F16C 33/76* (2006.01)
  *F16C 33/78* (2006.01)
  *F16C 41/00* (2006.01)
  *F16C 19/18* (2006.01)

(52) U.S. Cl.
  CPC ......... *B60B 27/0073* (2013.01); *B60B 27/0005* (2013.01); *F16C 33/723* (2013.01); *F16C 33/768* (2013.01); *F16C 33/783* (2013.01); *F16C 19/186* (2013.01); *F16C 41/007* (2013.01); *F16C 2240/40* (2013.01); *F16C 2326/02* (2013.01)

(58) Field of Classification Search
  CPC ............ B60B 27/0073; B60B 27/0005; F16C 33/723; F16C 2326/02
  See application file for complete search history.

(56) References Cited

U.S. PATENT DOCUMENTS

| 5,172,984 | A | 12/1992 | Lederman | |
|---|---|---|---|---|
| 2013/0195389 | A1* | 8/2013 | Seki et al. | ..................... 384/446 |
| 2013/0249273 | A1* | 9/2013 | Norimatsu | ..................... 301/109 |
| 2014/0010487 | A1* | 1/2014 | Seki et al. | ..................... 384/446 |

FOREIGN PATENT DOCUMENTS

| DE | 102006040776 A1 | 3/2008 |
|---|---|---|
| EP | 2466161 A1 | 6/2012 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A sealing device for a hub-wheel assembly that includes a rolling bearing is provided. The sealing device being has a screen assembled on an outer ring of the bearing and has an annular cylindrical wall, having an internal lateral surface press fit along an external lateral surface of a collar of the outer ring. The internal surface has a respective inner diameter (Di) and the external lateral surface has a respective outer diameter (De). A static sealing element is constrained to the screen; the ratio of the interference between inner diameter (Di) and outer diameter (De) over a screen thickness ranging between 0.22 and 0.5; a coupling length (L, L') between the internal lateral surface and the external lateral surface is equal or greater than 5 mm; and a ratio between outer diameter (De) of the external lateral surface and coupling length (L, L') ranging between 1 and 1.19.

6 Claims, 3 Drawing Sheets

SEALING DEVICE FOR A HUB-WHEEL ASSEMBLY

CROSS-REFERENCE TO RELATED APPLICATIONS

This application claims priority to Italian Patent Application No. TO2013A000660 filed Aug. 2, 2013, the contents of which are herein fully incorporated by reference.

TECHNICAL FIELD

The present invention is related to a sealing device for a hub-wheel assembly. The present invention is particularly suitable, but not exclusively, for vehicle hub-wheel assemblies, which are provided with a rolling bearing for driven wheels. In such applications, the bearing inner ring is assembled on the wheel axis, transmitting to the wheel the rotational motion, while the bearing outer ring is assembled on a stationary hub, for example a hub for a vehicle suspension.

BACKGROUND ART

Being applications for driven wheels, not having a pass-through shaft along the bearing axis, such related sealing devices have an axi-symmetric cup shape, so that to wrap up the bearing outer ring. Since the bearing outer ring is stationary, such devices perform a static sealing, protecting the bearing from any environmental contaminant (water, mud, debris and so on).

Generally speaking, the sealing device comprises a metallic screen, substantially cup shaped, assembled on a collar of the outer ring of the rolling bearing by means of a press fit operation. In particular, the screen comprises an annular cylindrical wall, whose internal lateral surface is coupled by means of the press fit operation with the external lateral surface of a collar of the bearing outer ring. While in previous embodiments, the sealing device was designed to ensure its function only by means of the coupling with the bearing, in current known embodiments the sealing device has a metallic screen, to whom is steadily fixed an elastomeric sealing element, which externally wraps up the screen and ideally goes on along its profile with an appendage, which protrudes in axial direction and inside the bearing, so realizing a sealing lip.

Document EP 2 466 161 A1 discloses a bearing/hub unit for a motor-vehicle wheel, provided with a stationary bearing outer ring and a bearing inner ring defining together with the outer ring a cavity devoid of any sealing device; an encoder arranged inside the cavity and fixed externally on the inner ring; and a protective cover which is made of non-ferromagnetic material and is mounted on the outer ring to protect the encoder and close the cavity; there being provided a static sealing element which is joined to an outer edge of the protective cover.

Document DE 10 2006 040776 A1 discloses a roller bearing wherein a seat is conically formed for the cylindrical part of the sealing element.

The current geometry of the metallic screen and the collar of the bearing outer ring, particularly, the interference for press fit the surfaces of the two components and the coupling length of the same surfaces, causes, after the assembling, a remarkable conical shape of the annular cylindrical wall of the sealing device. Such phenomenon impacts the sealing quality. In fact, component endurance tests show, as end result, an increase of water infiltration percentages, which reach unacceptable values.

SUMMARY OF THE INVENTION

The aim of the present invention is to realize a sealing device for a hub-wheel assembly, without the above mentioned inconveniences.

According to the present invention, a sealing device for a hub-wheel assembly is described, the hub-wheel assembly being provided with a rolling bearing, the sealing device having the characteristics as in the enclosed independent claim.

By optimizing the interference and the coupling length between the screen of the sealing device and the bearing outer ring, the advantage to almost reduce to zero the conical shape of the annular cylindrical wall is achieved, which is beneficial for the static sealing to be realized.

Further embodiments of the invention, preferred and/or particularly advantageous, are described according to the characteristics as in the enclosed dependent claims.

BRIEF DESCRIPTION OF THE DRAWINGS

The invention will be described by reference to the enclosed drawings, which show some non-limitative embodiments, namely.

DETAILED DESCRIPTION OF THE INVENTION

Figure 1:
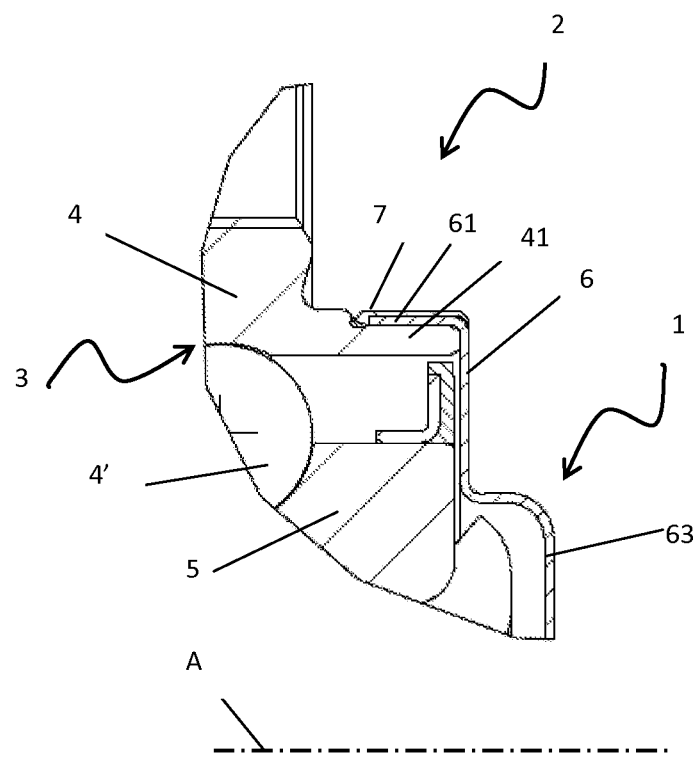
FIG. 1 is a partial section of a hub-wheel assembly having a sealing device according to the invention.

With reference to FIG. 1, 1 is the whole sealing device for a hub-wheel assembly 2. The hub-wheel assembly 2 is provided with a rolling bearing 3 comprising an outer ring 4, which is co-axial to a rotational axis A of the bearing 3 itself, an inner ring 5, which is co-axial to the outer ring 4 and a plurality of rolling elements 4', for example balls.

Figure 2:
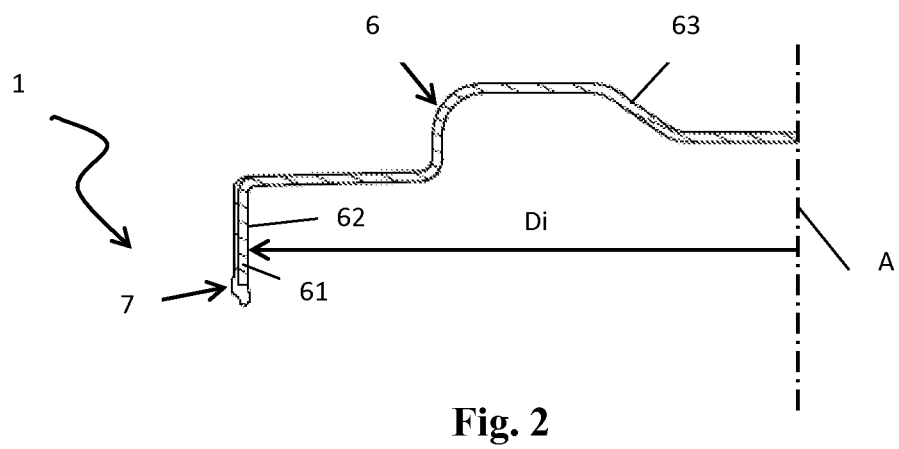
FIG. 2 is a section of the sealing device of FIG. 1, according to a first embodiment.
Figure 3:
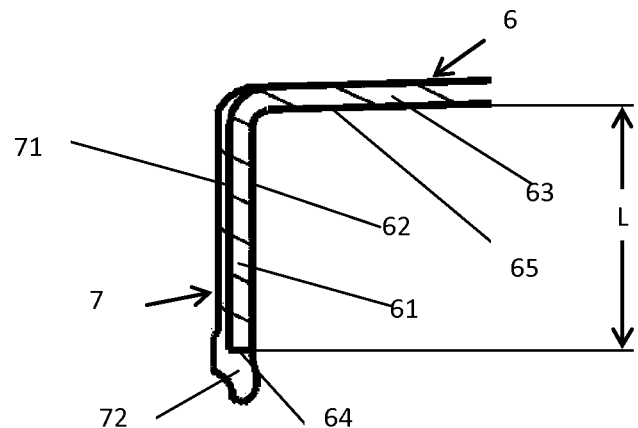
FIG. 3 is a detail of FIG. 2, showing the press-fit surface of the sealing device and a portion of the elastomeric lip.

According to the present invention and also with reference to FIGS. 2 and 3, the sealing device 1 comprises a screen 6, which is assembled on the outer ring 4 of the bearing 3. The screen 6 is substantially cup-shaped and comprises an annular cylindrical wall 61, having an internal lateral surface 62, and a substantially radially circular wall 63, which is steadily fixed to the annular cylindrical wall 61, the circular wall 63 being the bottom of the screen 6. The sealing device also comprises a static sealing element 7, substantially shaped as an annular cylinder. The static sealing element 7 is externally constrained to the screen 6 and is an annular cylindrical wall 71. The static sealing element 7 is preferably made of elastomeric material and is steadily fixed to the screen 6 by means of known methods, for example vulcanization. The static sealing element 7 axially protrudes beyond the end surface 64 of the annular cylindrical wall 61, assuming the shape of an annular cylindrical lip 72.

Figure 4:
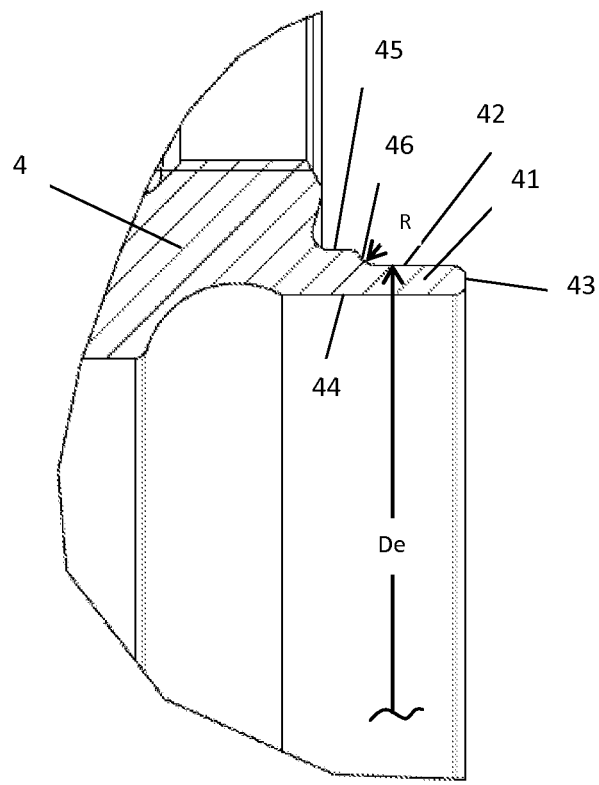
FIG. 4 is a partial section of the bearing outer ring and particularly shows its collar, where the sealing device is press-fit.

With reference to FIG. 4, the bearing outer ring 4 has a collar 41, which is confined by a first external lateral surface 42, a front annular surface 43 and an internal lateral surface 44. The collar 41 is the outer ring 4 portion on which the sealing device 1 is press-fit. The external profile of the collar 41 axially continues with a second external lateral surface 45, whose diameter is greater than the diameter of the first surface 42. Surfaces 42 and 45 are each other connected by a circular junction 46 having a radius R.

As shown in FIG. 1, the assembling of the sealing device 1 is carried out by coupling with interference the screen 6 on the collar 41 of the outer ring 4; the interference is provided between the external diameter De of the first external lateral surface 42 of the collar 41 and the internal diameter Di of the internal lateral surface 62 of the cylindrical annular wall 61 of the screen 6. The press-fit operation of the screen 6 on the collar 41 is carried out by stopping the internal surface 65 of the screen circular wall 63 against the front annular surface 43 of the collar 41. The coupling length L is determined by the length of the annular cylindrical wall 61 of the screen 6, in other words, by the distance between the internal surface 65 of the circular wall 63 and the end surface 64 of the annular cylindrical wall 61. After the assembling, the lip 72 of the sealing element 7 is compressed against the collar 41 surface, which is confined by the circular junction 46, having the radius R, and the lip will provide a suitable sealing force.

To verify the main result of the present invention, i.e. the conical shape reduction of the annular cylindrical wall 61 of the screen 6 after press-fit, experimental tests have shown that such a result is achieved if: interference values between the diameter Di of the internal lateral surface 62 of the cylindrical annular wall 61 of the screen 6 and diameter De of the first external lateral surface 42 of the collar 41 let the ratio interference/screen thickness ranging between 0.22 and 0.5; a coupling length L between the internal lateral surface 62 and the external lateral surface 42 is equal or greater than 5 mm; the ratio between the outer diameter De of the external lateral surface 42 and coupling length L ranges between 1 and 1.19.

Operating in such a way, the conical shape of the annular cylindrical wall 61 reaches a value almost equal to zero, which is beneficial for the bearing sealing all along its lifetime.

According to a preferred embodiment, always aimed to improve the performances of the sealing device, it is possible to increase the compression strength, the lip 72 gets from the static sealing element 7 of the collar 41, in particular the surface which is confined by the circular junction 46.

Moreover, always to increase the compression strength on the lip 72, it is advantageous to locate the surface confined by the circular junction 46 of the collar 41, in a way that the sealing lip is suitable deformed, the force on the lip 72 increases and consequently the contact pressure in that area increases as well. This can be achieved by designing the distance D between the center of the circular junction 46, having the radius R, and the front annular surface 43 of the collar 41 in a way that such a distance is equal or greater than 5 mm.

Finally, having the purpose to locate the lip 72, after the assembling and therefore in a compressed state, on the circular junction 46, it is beneficial that the ratio between the distance D (as the, the distance between the circular junction 46 and the front annular surface 43 of the collar 41) and the coupling length L of the annular cylindrical wall 61 of the screen 6 ranges between 1 and 1.19.

Figure 5:
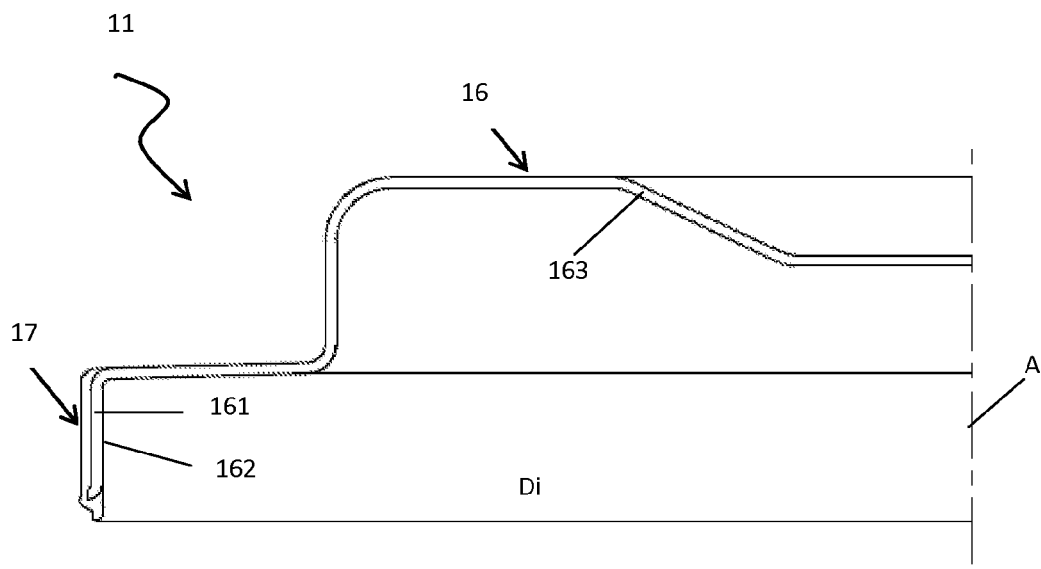
FIG. 5 is a section of the sealing device of FIG. 1, according to an alternative embodiment.
Figure 6:
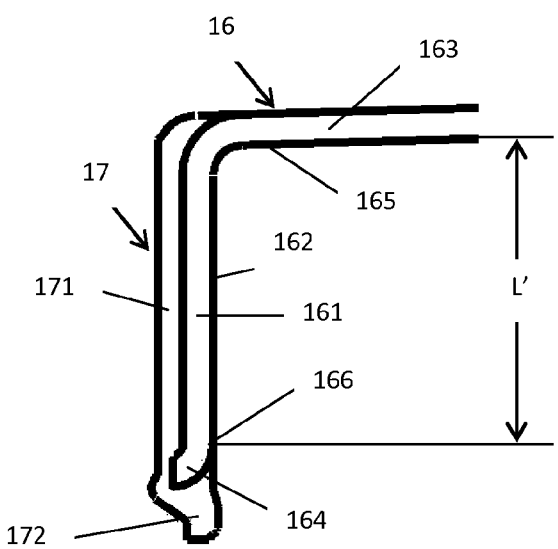
FIG. 6 is a detail of FIG. 5, showing the press-fit surface of the sealing device and a portion of the elastomeric lip.

An alternative embodiment of the sealing device according to the invention is shown in FIG. 5 and in detail in FIG. 6. In such figures, the sealing device 11 comprises a screen 16, also in this embodiment being substantially cup-shaped and comprising an annular cylindrical wall 161, which is provided with an internal lateral surface 162, and a substantially radially circular wall 163, which is steadily fixed to the annular cylindrical wall 161, the circular wall 163 being the bottom of the screen 16. Peculiar of this embodiment is that the annular cylindrical wall 161 is provided with an end appendage 164, which is bended in a radially external direction.

Also in this embodiment, the sealing device 11 further comprises a static sealing element 17, having a substantially annular cylindrical shape. The static sealing element 17 is externally constrained to the screen 16 and is an annular cylindrical wall 171. The static sealing element 17 is preferably made of elastomeric material and is steadily fixed to the screen 16 by means of known methods, for example vulcanization. The static sealing element 17 axially protrudes beyond the end appendage 164 of the annular cylindrical wall 161, assuming the shape of an annular cylindrical lip 172.

The assembly of the sealing device 11 is the same as for the sealing device 1: the assembling of the sealing device 11 is carried out by coupling with interference the screen 16 on the collar 41 of the outer ring 4 and the interference is provided between the external diameter De of the first external lateral surface 42 of the collar 41 and the internal diameter Di of the internal lateral surface 162 of the cylindrical annular wall 161 of the screen 16. The press-fit operation of the screen 16 on the collar 41 is carried out by stopping the internal surface 165 of the screen circular wall 163 against the front annular surface 43 of the collar 41. The coupling length L' is determined by the length of the annular cylindrical wall 161 of the screen 16, in other words, by the distance between the internal surface 165 of the circular wall 163 and the attack edge 166 of the end appendage 164 of the annular cylindrical wall 161. After the assembling, the lip 172 of the sealing element 17 is compressed against the collar 41 surface, which is confined by the circular junction 46, having the radius R, and the lip will provide a suitable sealing force.

Also for this embodiment, after the assembling, the conical shape of the annular cylindrical wall 161 of the screen 16 becomes almost equal to zero if: interference values between the diameter Di of the internal lateral surface 162 of the cylindrical annular wall 161 of the screen 16 and diameter De of the first external lateral surface 42 of the collar 41 let the ratio interference/screen thickness ranging between 0.22 and 0.5; a coupling length L' between the internal lateral surface 162 and the external lateral surface 42 is equal or greater than 5 mm; the ratio between the outer diameter De of the external lateral surface 42 and coupling length L' ranges between 1 and 1.19.

As for the sealing device 1, to improve the performances of the sealing device 11, it is possible to increase the compression strength, the lip 172 gets from the static sealing element 17 of the collar 41, in particular by making stiffer the lip 172.

Moreover, always to increase the compression strength on the lip 172, it is advantageous to locate the surface confined by the circular junction 46 of the collar 41, in a way that the sealing lip is suitable deformed, the force on the lip 172 increases and consequently the contact pressure in that area increases as well. This can be achieved by designing the distance D between the center of the circular junction 46, having the radius R, and the front annular surface 43 of the collar 41 in a way that such a distance is equal or greater than 5 mm. Finally, having the purpose to locate the lip 172, after the assembling and therefore in a compressed state, on the circular junction 46, it is beneficial that the ratio between the distance D (as the, the distance between the circular junction 46 and the front annular surface 43 of the collar 41) and the coupling length L' of the annular cylindrical wall 161 of the screen 16 ranges between 1 and 1.19.

Thanks to end appendage 164, the embodiment of the sealing device 11 allows to obtain a greater contact pressure of the lip 172 on the surface of the circular junction 46.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A sealing device for a hub-wheel assembly including a rolling bearing, the sealing device comprising:
    a screen, assembled on an outer ring of the bearing and provided with an annular cylindrical wall, having an internal lateral surface press fit along an external lateral surface of a collar of the outer ring, the internal lateral surface having a respective inner diameter (Di) and the external lateral surface having a respective outer diameter (De); and
    a static sealing element, constrained to the screen; and wherein the sealing device provides:
    a ratio of an interference between inner diameter (Di) and outer diameter (De) over a screen thickness ranging between 0.22 and 0.5;
    a coupling length (L, L') between the internal lateral surface and the external lateral surface equal or greater than 5 mm; and
    a ratio between outer diameter (De) of the external lateral surface and coupling length (L, L') ranging between 1 and 1.19.

2. The sealing device according to claim 1, wherein the coupling length (L) between the internal lateral surface of the screen and the external lateral surface is equal to the distance between an internal surface of a substantially circular wall of the screen and an end surface of the annular cylindrical wall.

3. The sealing device according to claim 1, wherein the annular cylindrical wall includes an end appendage, folded in an outwardly radial direction.

4. The sealing device according to claim 3, wherein the coupling length (L') between the internal lateral surface and the external lateral surface is determined by the distance between an internal surface of a substantially circular wall and a leading edge of the end appendage of the annular cylindrical wall.

5. The sealing device according to claim 1, wherein the distance (D) between the center of a circular junction of the collar, having a radius (R), and an annular front surface of the collar is equal or greater than 5 mm.

6. The sealing device according to claim 5, wherein the ratio between the distance (D) and the coupling length (L') ranges between 1 and 1.19.

* * * * *